March 25, 1969     S. E. MANECKE     3,435,189
THERMOSTATIC CONTROL SYSTEM FOR WATER HEATER TANKS OR THE LIKE
Filed June 28, 1965     Sheet 1 of 3
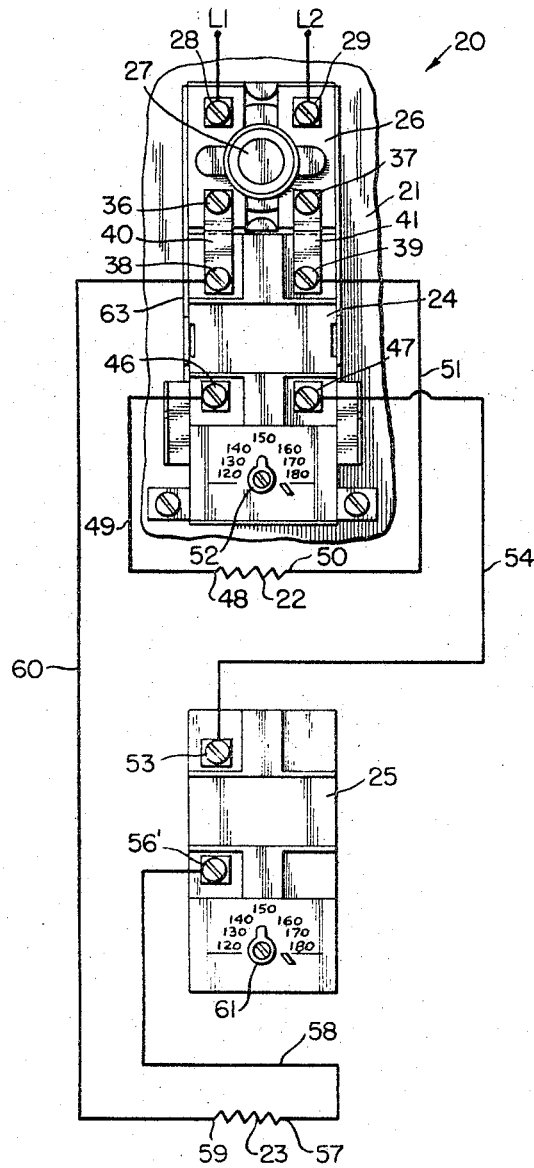
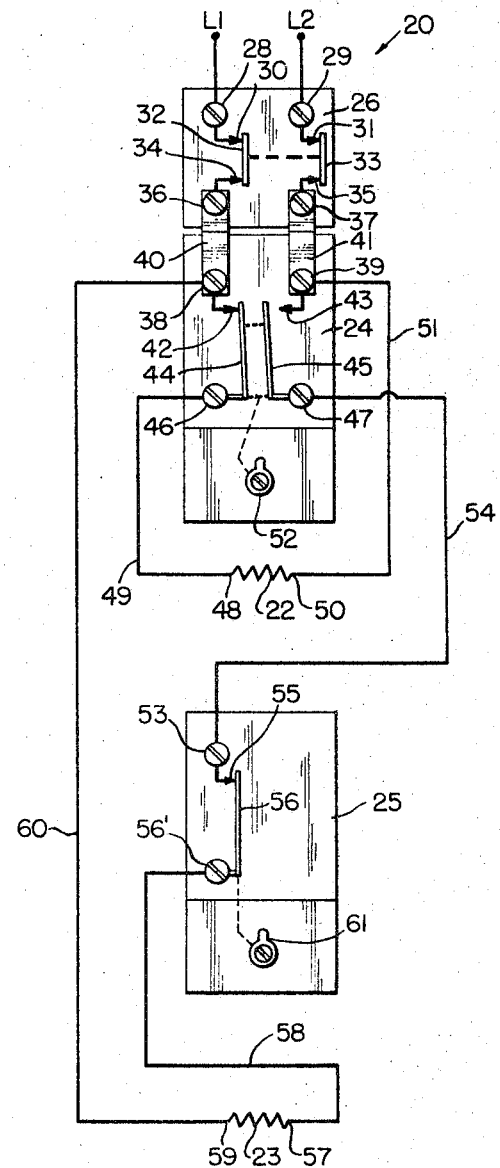
INVENTOR.
SIEGFRIED E. MANECKE
BY
*Candor & Candor*
HIS ATTORNEYS

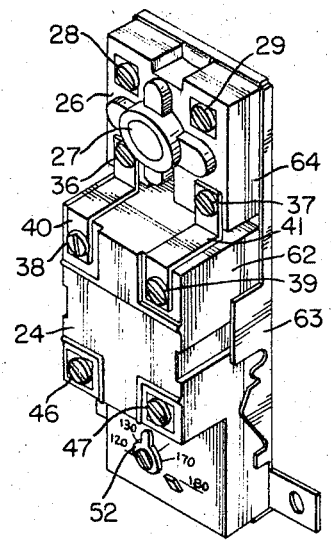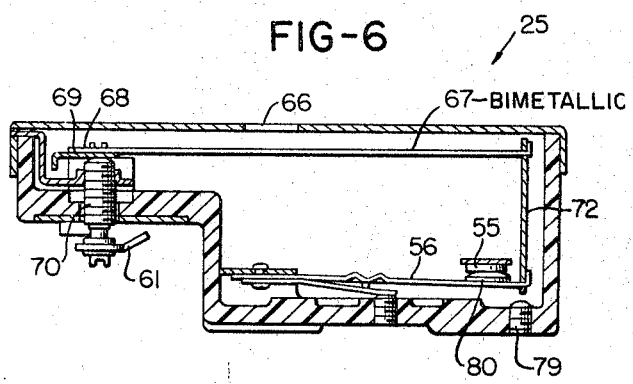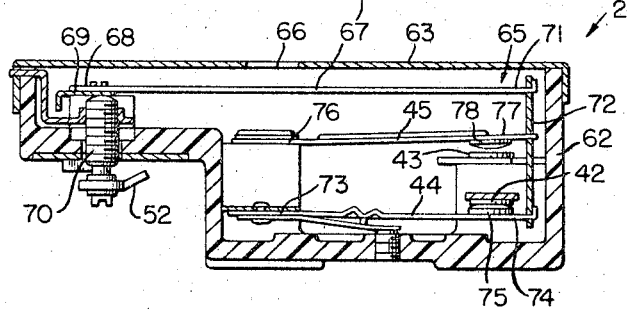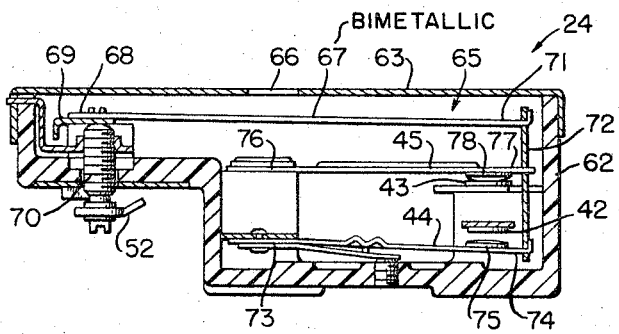

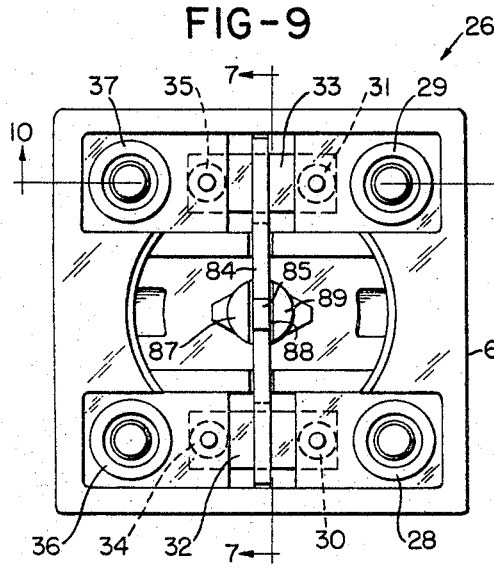
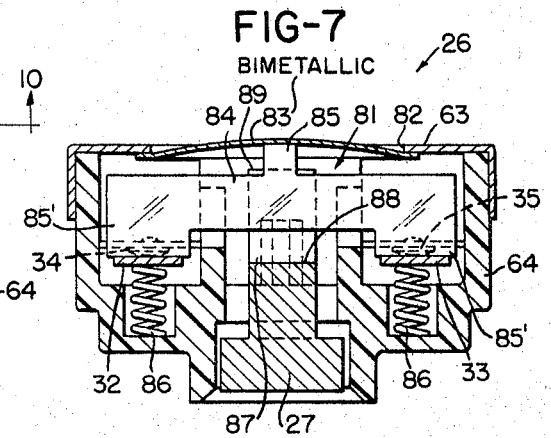
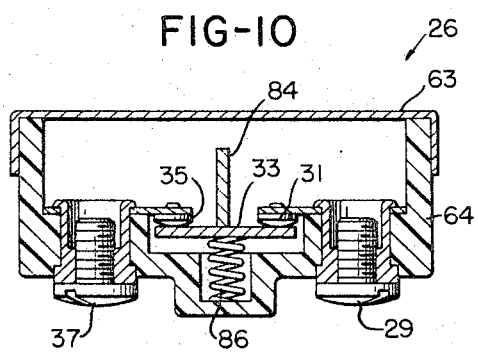
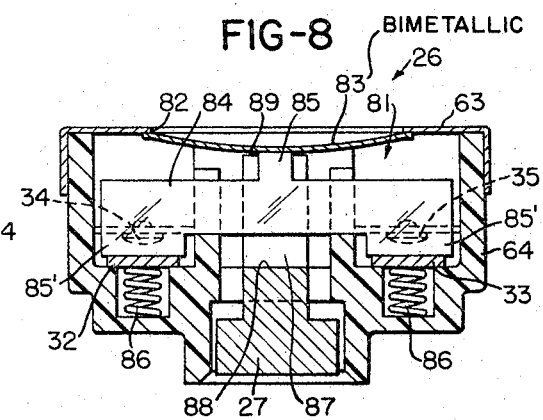
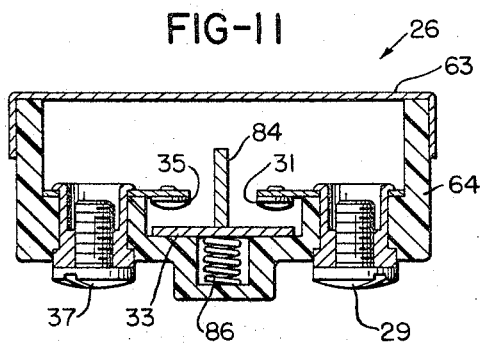
INVENTOR.
SIEGFRIED E. MANECKE
HIS ATTORNEYS United States Patent Office 3,435,189
Patented Mar. 25, 1969

3,435,189
THERMOSTATIC CONTROL SYSTEM FOR WATER
HEATER TANKS OR THE LIKE
Siegfried E. Manecke, 1704 Church St.,
Indiana, Pa. 15701
Filed June 28, 1965, Ser. No. 467,409
Int. Cl. H05b 1/02; H05 3/02; H01h 37/54
U.S. Cl. 219—321
12 Claims

ABSTRACT OF THE DISCLOSURE

A thermostatic control system for controlling the temperature of a water heater tank has a first thermostat for controlling an upper heater in the tank and a second thermostat for controlling the operation of a heater in the lower portion of the tank. Both thermostats are under the control of a safety limit switch which, upon attainment of a temperature above a safe limit, terminates the operation of the heaters until the safety switch is manually reset. The thermostats and heaters are connected in circuit with each other in such manner that simultaneous operation of both heaters is impossible.

---

This invention relates to an improved circuit combination, as well as to improved parts for such a circuit combination, or the like.

In particular, this invention is readily adapted to provide an electrical circuit for the electrical heating means of a domestic water heater, or the like.

For example, this invention provides an improved circuit wherein a first thermostatic switch means controls the energizing and deenergizing of an upper electrical heater for the water heater tank and a second thermostatic switch controls the energizing and deenergizing of a lower electrical heater for the water heater tank, both of the thermostatic switches being under the control of a safety limit switch which, when senses a temperature above a safe limit, terminates the operation of the electrical heaters until the safety limit switch is manually reset.

In particular, the disclosed embodiment of this invention has a pair of power source leads interconnected to two terminals of the safety limit thermostatic switch construction which has bimetallic operated switch means that interconnects the other terminal of the first pair other pair of terminals thereof when the safety limit switch construction senses a temperature below a safe limit. The last-named terminals of the safety limit switch construction are interconnected to a first pair of terminals of the first thermostatic switch construction which has bimetallic operated switch means that interconnects one of the first pair of terminals thereof to another terminal that leads to one side of a first heater when the first thermostatic switch construction senses a temperature below a first-predetermined temperature, the other side of the first heater being electrically interconnected to the other terminal of the first pair of terminals of the first thermostatic switch construction. The bimetal operated switch construction of the first thermostatic switch construction interconnects the other terminal of the first pair of terminals thereof with still another terminal when the bimetal member senses a temperature above its first predetermined temperature, that last-named terminal being interconnected to one side of a series circuit that includes a second thermostatic switch construction and a second heater. The other side of the series circuit is electrically interconnected to the first-named terminal of the first pair of terminals of the first thermostatic switch construction. The second thermostatic switch construction has a bimetallic operated switch blade that opens the series circuit when the second switch construction senses a temperature above a second predetermined temperature and closes the series circuit when the same senses a temperature below the second predetermined temperature.

Accordingly, it is an object of this invention to provide an improved electrical circuit combination having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a front fragmentary view illustrating the improved parts of the combination of this invention with the electrical heaters being indicated schematically.

FIGURE 2 is a view similar to FIGURE 1 and schematically illustrates the operating parts of the structure illustrated in FIGURE 1.

FIGURE 3 is a perspective view of the first thermostatic switch construction and the safety limit switch construction of this invention.

FIGURE 4 is a cross-sectional view taken through the first thermostatic switch construction of this invention.

FIGURE 5 is a view similar to FIGURE 4 and illustrates the switch construction of FIGURE 4 in another operating position thereof.

FIGURE 6 is a vew similar to FIGURE 4 and illustrated the second thermostatic switch construction of this invention.

FIGURE 7 is a cross-sectional view of the safety limit switch construction of this invention and is taken on line 7—7 of FIGURE 9.

FIGURE 8 is a view similar to FIGURE 7 and illustrates the switch construction in another operating position thereof.

FIGURE 9 is a rear view of the switch structure illustrated in FIGURE 7 with the thermostatic element removed.

FIGURE 10 is a cross-sectional view taken on line 10—10 of FIGURE 9.

FIGURE 11 is a view similar to FIGURE 10 and illustrates the switch construction in another operating position thereof.

While the various features of this invention are hereafter illustrated and described as being particularly adaptable for providing a control system for a water heater tank or the like, it is to be understood that the various features of this invention can be utilized singly or in any combination thereof to provide control circuits for other devices as desired.

Therefore, this invention is not to be limited to only the embodiment illustrated in the drawings, because the drawings are merely utilized to illustrate one of the wide variety of uses of this invention.

Referring now to FIGURES 1 and 2, an improved control system of this invention is generally indicated by the reference numeral 20 and comprises a water heater tank 21 having an upper electrical heating element 22 and a lower electrical heating element 23. The upper heating element 22 is thermostatically controlled by a first thermostatic unit 24 of this invention. The lower heating element 23 is controlled by a second thermostatic unit 25 of this invention.

However, the operation of the electrical heating elements 22 and 23 will be terminated when a safety limit thermostatic unit 26 of this invention senses that the temperature of the water in the water heater tank 21 has exceeded a safe limit, whereby the heaters 22 and 23 cannot again be operated until the operator manually resets the safety limit switch 26 by means of a reset button 27 thereof in a manner hereinafter described.

As illustrated in FIGURES 1 and 2, the power source leads $L_2$ and $L_2$ are interconnected to terminals 28 and 29 of the safety limit thermostatic switch construction 26 with the terminals 28 and 29 being electrically interconnected to contacts 30 and 31, the contacts 30 and 31 are normally bridged by movable electrical conductors 32 and 33 which place the contacts 30 and 31 into electrical contact with contacts 34 and 35 leading respectively to terminal means 36 and 37 of the safety limit switch construction 26.

The terminals 36 and 37 of the safety limit switch construction 26 are placed in electrical connection with terminals 38 and 39 of the first thermostatic switch construction 24 by rigid bus bar leads 40 and 41 in a manner hereinafter described.

The terminals 38 and 39 are electrically connected to contacts 42 and 43 of the thermostatic switch construction 24 which has switch arms 44 and 45, the switch arm 44 electrically connecting the contact 42 with a terminal 46 when the switch arms 44 and 45 are in the position illustrated in FIGURE 2 and the switch arm 45 placing the contact 43 into electrical connection with a terminal 47 when the switch arms 44 and 45 are moved to the right from the position illustrated in FIGURE 2 for a purpose hereinafter described, whereby the contact 42 is interconnected to the terminal 46 while the contact 43 is not interconnected to the terminal 47 and, conversely, the contact 43 is interconnected to the terminal 47 when the contact 42 is not interconnected to the terminal 46.

The terminal 46 of the thermostatic switch construction 24 is interconnected to one side 48 of the upper heating element 22 by a flexible lead 49, the other side 50 of the upper heating element 22 is interconnected to the terminal 39 by a flexible lead 51.

The thermostatic switch construction 24 carries a manually operated control knob 52 which is adapted to select a temperature to be maintained by the upper heating element 22 in a manner hereinafter described.

The second thermostatic switch construction 25 has a terminal 53 interconnected to the terminal 47 of the first thermostatic switch construction 24 by a flexible lead 54, the terminal 53 being electrically connected to a contact 55. A switch arm 56 is carried by the thermostatic switch construction 25 and is adapted to interconnect the contact 55 with a terminal 56' which, in turn, is interconnected to one side 57 of the lower heating element 23 by a flexible lead 58. The other side 59 of the lower heating element 23 is interconnected to the terminal 38 of the first thermostatic switch construction 24 by a flexible lead 60.

The second thermostatic switch construction 25 has a manually operated selector knob 61 for setting the desired temperature that the thermostatic unit 25 is to maintain in the lower region of the water heater tank 21 by means of the heater means 23 in a manner now to be described.

When the control system 20 is disposed in the position illustrated in FIGURE 2 and the thermostatic switch construction 24 determines that the water in the water heater tank 21 being sensed thereby is not at the temperature selected by the knob 52, the switch arms 44 and 45 are disposed in the position illustrated in FIGURE 2, whereby the current from the power source lead $L_1$ passes to the terminal 28, contact 30, switching element 32, contact 34, terminal 36, rigid lead 40, terminal 38, contact 42, switch arm 44, terminal 46, lead 49 and heating element 22 back to the lead $L_2$ by means of the lead 51, terminal 39, rigid lead 41, terminal 37, contact 35, switching element 33, contact 31, and terminal 29. In this manner, the heating element 22 is energized to heat up the water in the water heater tank 21.

When the water in the water heater tank 21 as sensed by the thermostatic switch construction 24 is at the proper selected temperature, the switch arms 44 and 45 move from the position illustrated in FIGURE 2 over to the right to disconnect the upper heating element 22 from the power leads $L_1$ and $L_2$ and place the switch arm 45 into contact with the contact 43 while the switch arm 44 is moved out of contact with the contact 42.

If the temperature in the lower portion of the water heater tank 21 is below the temperature selected by the selector knob 61, current now flows through the lower heating element 23. In particular, power lead $L_1$ is interconnected to the side 59 of the lower heater element 23 by means of the terminal 28, contact 30, switching element 32, contact 34, terminal 36, rigid lead 40, terminal 38, and flexible lead 60, while the side 57 of the heating element 23 is interconnected to the power source lead $L_2$ by means of the flexible conductor 58, terminal 56', switch arm 56, contact 55, terminal 53, flexible conductor 54, terminal 47, switch arm 45, contact 43, terminal 39, rigid lead 41, terminal 37, contact 35, switching element 33, contact 31 and terminal 29.

When the temperature in the lower region of the water heater tank 21 reaches the selected temperature, the switch arm 56 moves out of contact with the contact 55 whereby the current flow through the lower heating element 23 is terminated.

Thus, it can be seen that the thermostatic switch constructions 24 and 25 maintain the temperature in the upper and lower regions of the water heater tank 21 at the selected temperature by opening and closing the switch arms 44, 45 and 56 under the control of thermostatic elements in a manner hereinafter described.

However, if either the lower heating element 23 or the upper heating element 22 is being operated and the particular thermostatic unit 24 or 25 malfunctions so that the particular heating element 23 or 22 will not be normally deenergized when the selected temperature is reached, the safety limit thermostatic switch construction 26 continuously senses the temperature in the water heater tank 21 and, should the same exceed a safe temperature limit, the safety limit thermostatic switch construction 26 moves the switching arms 32 and 33 respectively out of contact with the contacts 30, 34 and 31, 35 to terminate the flow of current to either heating elements 22 and 23 so the heating elements 22 and 23 cannot be further operated until the operator resets the switching elements 32 and 33 back to the position illustrated in FIGURE 2 by operation of a reset button 27 in a manner hereinafter described.

Therefore, it can be seen that the control system 20 of this invention is readily adapted to maintain the temperature of the water in the water heater tank 21 at the selected temperatures.

As illustrated in FIGURE 3, the first thermostatic switch construction 24 includes a housing 62 suitably attached to a mounting bracket 63 while the safety limit switch construction 26 includes a housing means 64 also suitably attached to the mounting bracket 63 whereby the switch constructions 24 and 26 can be suitably mounted to the water heater tank 21 in the desired location by the mounting bracket 63.

It can readily be seen in FIGURE 3 that the terminals 36 and 37 of the switch construction 26 are effectively interconnected to the terminals 38 and 39 of the first thermostatic switch construction 24 by the rigid bus bar leads 40 and 41 suitably bent to be complementary to the housings 62 and 64. Thus, the rigid leads 40 and 41 can be maintained in the position illustrated in FIGURE 3 by backing out the screws of the terminals 38 and 39 a sufficient distance to permit the flexible leads 60 and 51 to be attached thereto whereby it can be seen that in the control system 20 of this invention only one flexible lead is attached to each terminal. In this manner, the terminals 38 and 39, which require two leads to be attached thereto, can have one of the rigid leads 40 or 41 attached thereto while the other lead is a flexible lead 60 or 51 so that the attachments at the terminals 38 and 39 can be effectively made. Further, when the screws at the terminals 38 and 39 are tightened, the rigid leads 40 and 41 are held in place so that the screws at the terminals 38 and 39 can be tightened in a manner to effectively attach the flexible leads 60 and 51 without worrying about the rigid leads 40 and 41 being rotated during the screw tightening operation. It should be noted that terminals 36 and 38 are electrically the same as is the case with terminals 37 and 39. It is therefore possible to connect flexible lead 60 to either terminal 36 or 38 and to connect flexible lead 51 to either terminal 37 or 39 in the manner described.

The particular details of the first thermostatic switch construction 24 and the second thermostatic switch construction 25 is fully set forth and claimed in the copending patent application, Ser. No. 263,033, filed Mar. 5, 1963, now Patent No. 3,238,237, and assigned to the same assignee as this application.

Therefore, only sufficient details of the switch constructions 24 and 25 will now be described in order to fully understand the operation of the system 20 previously described.

In particular, reference is made to FIGURES 4 and 5 wherein the first thermostatic switch construction 24 includes the housing 62 having an open rear end 65 closed by the bracket means 63 with the bracket means having a suitable opening 66 provided therein.

A bimetallic member 67 is disposed in the housing 62 and has one end 68 fixed to a leaf-type spring 69 carried by the housing means 62 and adjusted upwardly and downwardly by a threaded adjusting member 70 rotatably carried by the housing 62 and rotated by the control knob 52 previously described. The other end 71 of the bimetallic member 67 is interconnected to a tie bar 72 movably upwardly and downwardly in the housing 62 in accordance with the temperature sensed by the bimetallic member 67.

The switch blade 44 previously described has one end 73 fixed to the housing 62 and interconnected to the terminal 46, the other end 74 of the switch blade 44 being interconnected to the tie bar 72 and carrying a contact 75 cooperable with the fixed contact 42 previously described. The switch blade 44 is a snap-acting switch blade so that when the temperature sensed by the bimetallic member 67 exceeds the temperature set by the selector knob 52, the end 71 of the bimetallic member 67 begins to move downwardly carrying the tie bar 72 therewith so that subsequently the snap-acting blade 44 snaps downwardly to the position illustrated in FIGURE 5 whereby the contact 75 is moved away from the contact 42.

The switch blade 45 previously described has one end 76 fixed to the housing 62 and interconnected to the terminal 47, the other end 77 of the switch blade 45 being interconnected to the tie bar 72 and carrying a contact 78 cooperable with the fixed contact 43 previously described.

Thus, when the bimetallic member 67 has the end 71 moved downwardly to snap the blade 44 from the position illustrated in FIGURE 4 to the position illustrated in FIGURE 5, the contact 78 of the blade 45 makes electrical contact with the fixed contact 43 while the movable contact 75 is moved out of engagement with the fixed contact 42 to perform the switching operation previously described and schematically illustrated in FIGURE 2.

The second thermostatic switch construction 25 illustrated in FIGURE 6 is substantially identical to the switch construction 24 illustrated in FIGURES 4 and 5 except that the switch blade 45 and fixed contact 43 are removed therefrom and the downward movement of the switch blade 56 is terminated by an adjusting screw 79.

Thus, when the bimetallic member 67 of the switch construction 25 illustrated in FIGURE 6 senses a temperature exceeding the temperatures set by the control knob 61 thereof, the tie bar 72 is moved downwardly to snap the blade 56 downwardly so that a contact 80 carried thereby will be moved away from the fixed contact 55 previously described.

Conversely, when the bimetallic member 67 of the switch constructions 24 and 25 sense a temperature below the selected temperature set by the control knobs 52 and 61, the bimetallic members 67 move upwardly to the positions illustrated in FIGURES 4 and 6 whereby the contact 75 of the switch blade 44 of the switch construction 24 is disposed in electrical contact with the fixed contact 42 with the contact 78 of the switch blade 45 out of electrical contact with the fixed contact 43 and the contact 80 of the switch blade 56 is disposed in electrical contact with the fixed contact 55.

Accordingly, it can be seen that when the thermostatic switch constructions 24 and 25 are disposed against the exterior wall 21 of the water heater tank in the desired location, the respective bimetallic member 67 thereof senses the temperature of the water at the particular location of the switch construction 24 and 25 to operate the contacts thereof in the manner previously described so that the thermostatic switch constructions 24 and 25 maintain the water in the water heater tank at the selected temperature by the operation of the heater means 22 and 23 in the manner previously described.

The safety limit switch construction 25 is fully disclosed and claimed in the copending patent application, Ser. No. 361,141, filed Apr. 20, 1964, now U.S. Patent No. 3,272,946 and assigned to the same assignee as this application whereby the particular details and operation thereof need not be fully set forth in this application.

However, in order to fully understand the operation of the safety limit switch construction 26 in the circuit 20 of this invention, reference is now made to FIGURES 7–11 wherein the safety limit switch construction 26 includes the housing 64 having an open rear end 81 closed by the bracket means 63, the bracket means 63 having an opening 82 passing therethrough.

A thermostatic snap-acting disc construction 83 is trapped between the bracket 63 and the housing 64 to be movable from the position illustrated in FIGURE 7 to the position illustrated in FIGURE 8 when the bimetallic disc construction 83 senses a temperature at the water heater tank 21 above a safe temperature thereof.

As illustrated in FIGURE 7, a motion transmitting member 84 is provided and has an intermediate leg 85 bearing against the snap-acting member 83, the member 84 having a pair of legs 85' extending in the other direction and respectively engaging the bridging members 32 and 33 urged upwardly by compression springs 86.

When the disc construction 83 is in the position illustrated in FIGURE 7, the compression springs 86 are sufficient to place the bridging members 32 and 33 respectively against the contacts 30, 34 and 31, 35 in the manner illustrated in FIGURES 7 and 10. However, when the snap-acting thermostatic disc construction 83 is snapped over center to the position illustrated in FIGURES 8 and 11, the motion transmitting member 84 pushes downwardly on the bridging members 32 and 33 to move the same away from their fixed contacts 30, 34, and 31, 35 in the manner illustrated in FIGURES 8 and 11 to terminate the flow of current through the system 20.

In order to reset the snap-acting disc 83, the reset button 27 includes a shaft portion 87 having a slot 88 passing therethrough and receiving the motion transmitting member 84 whereby the free end 89 of the reset button 27 is adapted to be pushed upwardly from the position illustrated in FIGURE 8 to have the end 89 thereof engage the snapped-over thermostatic disc construction 83 to snap the same back over center to the position illustrated in FIGURE 7 whereby the compression springs 86 will carry the motion transmitting member 84 therewith and cause the bridging members 32 and 33 to be placed in electrical contact with their respective fixed contacts 30, 34 and 31, 35 in the manner illustrated in FIGURE 7.

However, if the temperature sensed by the snap-action disc construction 83 hasn't fallen below the safe limit thereof, inward movement of the reset button 27 will not be sufficient to snap the disc construction 83 over center whereby the bridging members 32 and 33 will not be placed into electrical contact with their respective contacts 30, 34 and 31, 35 until the disc construction 83 has cooled sufficiently to permit resetting thereof. In this manner, the safety limit switch construction 26 cannot be reset until the temperature sensed by the bimetallic member 83 has fallen below the safe limit thereof.

Accordingly, it can be seen that this invention provides an improved circuit combination for controlling the operation of the heater means 22 and 23 in a unique and novel manner heretofore unattainable in the prior art, such circuit combination further permitting the flexible leads thereof to have each end thereof attached to a terminal without another flexible lead being attached at the same terminal in the manner previously described.

While the form of the invention now preferred has been disclosed as required by the statutes, other forms may be used, all coming within the scope of the claims which follow.

What is claimed is:
1. In combination, a safety limit switch construction having first, second, third, and fourth terminals, and switch means for electrically interconnecting said first terminal with said third terminal and said second terminal with said fourth terminal only when said switch construction senses a temperature below a predetermined high temperature, power leads respectively interconnected to said first and second terminals, a first thermostatic switch construction having a fifth, sixth, seventh and eighth terminals and switch means for only electrically interconnecting said fifth terminal with said seventh terminal when said first switch construction senses a temperature below a first predetermined temperature and for only electrically interconnecting said sixth terminal with said eighth terminal when said first switch construction senses a temperature above said first predetermined temperature, a second thermostatic switch construction having two terminals and switch means for only electrically interconnecting said two terminals when said second switch construction senses a temperature below a second predetermined temperature, a first electrical heater, a second electrical heater, a first lead interconnecting said third and fifth terminals, a second lead interconnecting said fourth and sixth terminals, a third lead interconnecting said seventh terminal with one side of said first heater, a fourth lead interconnecting the other side of said first heater with said second lead, a series circuit including said second heater and said second theremostatic switch, a fifth lead interconnecting said first lead with one end of said series circuit, and a sixth lead interconnecting the other end of said series circuit with said eighth terminal, said second heater being disposed at said one end of said series circuit whereby when said safety limit switch construction is sensing a temperature below said predetermined high temperature one of said power source leads is, in effect, always directly interconnected to said one end of said series circuit by said first and fifth leads and the other of said power source leads is, in effect, always directly interconnected to said other side of said first heater by said second and fourth leads.

2. A combination as set forth in claim 1 wherein said fifth lead and said first lead are respectively interconnected to said fifth terminal.

3. A combination as set forth in claim 1 wherein said fifth lead and said first lead are respectively interconnected to said third terminal.

4. A combination as set forth in claim 1 wherein said fourth lead and said second lead are respectively interconnected to said sixth terminal.

5. A combination as set forth in claim 1 wherein said fourth lead and said second lead are respectively interconnected to said fourth terminal.

6. A combination as set forth in claim 1 wherein said first lead is rigid, said fifth lead is flexible and said first lead and said fifth lead are attached by the same fastening means to the same terminal.

7. A combination as set forth in claim 1 wherein said first and second leads are rigid leads and said fourth and fifth leads are flexible leads.

8. A combination as set forth in claim 7 wherein said flexible leads and said rigid leads are respectively interconnected to the respective terminals by the same fastening means.

9. A combination as set forth in claim 7 wherein said first rigid lead and said fifth flexible lead are interconnected to said fifth terminal by the same fastening means.

10. A combination as set forth in claim 7 wherein said first rigid lead and said fifth flexible lead are interconnected to said third terminal by the same fastening means.

11. A combination as set forth in claim 7 wherein said second rigid lead and said fourth flexible lead are interconnected to said sixth terminal by the same fastening means.

12. A combination as set forth in claim 7 wherein said second rigid lead and said fourth flexible lead are interconnected to said fourth terminal by the same fastening means.

References Cited
UNITED STATES PATENTS

| | | | |
|---|---|---|---|
| 2,380,545 | 7/1945 | Pankow | 219—321 |
| 3,238,337 | 3/1966 | Rosenberg et al. | 200—138 |
| 3,246,119 | 4/1966 | Kinsella | 219—330 X |
| 3,329,800 | 7/1967 | Lee | 219—321 |
| 1,892,557 | 12/1932 | McCormick | 219—321 |
| 2,386,949 | 10/1945 | Hayward. | |
| 2,538,080 | 1/1951 | Bulesky | 200—138 |
| 3,254,796 | 6/1966 | Wright | 219—321 X |
| 3,272,946 | 9/1966 | Manecke | 200—138 |

ANTHONY BARTIS, *Primary Examiner.*

U.S. Cl. X.R.

219—330, 486, 489; 337—348, 367